United States Patent
Marsh

(10) Patent No.: US 8,584,397 B1
(45) Date of Patent: Nov. 19, 2013

(54) AUTOMATED PLANT WATERING SYSTEM

(76) Inventor: James Marsh, Cheney, WA (US)

( * ) Notice: Subject to any disclaimer, the term of this patent is extended or adjusted under 35 U.S.C. 154(b) by 71 days.

(21) Appl. No.: 13/169,109

(22) Filed: Jun. 27, 2011

Related U.S. Application Data

(60) Provisional application No. 61/358,874, filed on Jun. 25, 2010.

(51) Int. Cl.
*A01G 29/00* (2006.01)
*A01G 25/00* (2006.01)

(52) U.S. Cl.
USPC .............................................. 47/48.5; 47/79

(58) Field of Classification Search
USPC ....... 47/67, 66.7, 82, 79, 48.5, 59 R, 62 R, 63
See application file for complete search history.

(56) References Cited

U.S. PATENT DOCUMENTS

| | | | | |
|---|---|---|---|---|
| 2,198,309 A * | 4/1940 | James | ............................ | 177/117 |
| 2,828,935 A * | 4/1958 | Ziegler et al. | ................. | 177/117 |
| 3,168,797 A * | 2/1965 | Patassy | ............................. | 47/79 |
| 3,293,799 A * | 12/1966 | Keller et al. | ....................... | 47/79 |
| 4,241,538 A * | 12/1980 | Lahr | ................................. | 47/79 |
| 4,934,096 A * | 6/1990 | Bentvelsen | .................... | 47/62 N |
| 5,020,261 A * | 6/1991 | Lishman | ............................ | 47/79 |
| 5,351,437 A * | 10/1994 | Lishman | ........................... | 47/79 |
| 5,771,634 A * | 6/1998 | Fudger | .......................... | 47/62 N |
| 6,161,329 A * | 12/2000 | Spelt | ................................. | 47/67 |
| 6,295,865 B1 * | 10/2001 | Cherry | ............................. | 73/73 |
| 6,725,598 B2 * | 4/2004 | Yoneda et al. | ..................... | 47/60 |
| 7,337,580 B2 * | 3/2008 | Han et al. | .......................... | 47/71 |
| 7,971,390 B2 * | 7/2011 | McKenna | .......................... | 47/79 |
| 2007/0089365 A1 * | 4/2007 | Rowe | ................................ | 47/79 |

* cited by examiner

*Primary Examiner* — Andrea Valenti
(74) *Attorney, Agent, or Firm* — Antonio Papageorgiou; Ostrow Kaufman LLP

(57) ABSTRACT

A plant watering system is provided that includes a control module; at least one water valve in communication with the control module; and at least one weight sensor in communication with the control module. The control module is operable in at least one embodiment at least to: receive a signal from the at least one weight sensor corresponding to a weight of a plant measured by the at least one weight sensor; store a low weight and a high weight associated with each of the at least one weight sensors; and communicate a control signal to the at least one water valve that opens the at least one water valve at the low weight and closes the at least one water valve at the high weight.

8 Claims, 1 Drawing Sheet

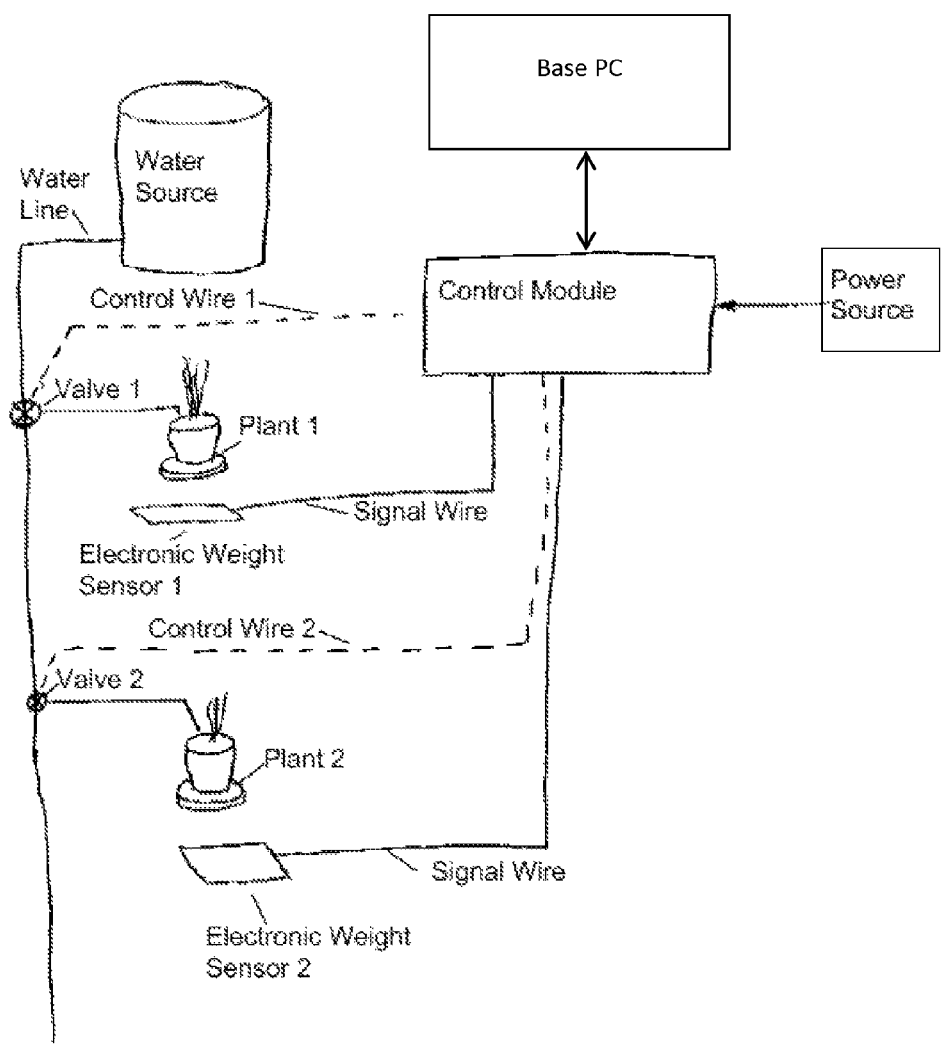

AUTOMATED PLANT WATERING SYSTEM

The present application claims priority to U.S. Provisional Patent Application No. 61/358,874, filed Jun. 25, 2010, which is incorporated herein by reference.

BACKGROUND

The present application relates to plant watering systems and more particularly automated plant watering systems.

A number of plant automated systems have been proposed. Some, for example, water plants based on moisture content of the soil. The moisture content may be measured directly or may be estimated by weight. Weight actuated mechanical valves have also been proposed. These systems, however, have numerous drawbacks. For instance, these systems maintain constant moisture in the soil of the plants, which is not suitable for all plants and may cause the plants to rot at the roots. Accordingly, there is a need for an automated watering system that is not so limited.

SUMMARY

A plant watering system is provided that includes a control module; at least one water valve in communication with the control module; and at least one weight sensor in communication with the control module. The control module is operable in at least one embodiment at least to: receive a signal from the at least one weight sensor corresponding to a weight of a plant measured by the at least one weight sensor; store a low weight and a high weight associated with each of the at least one weight sensors; and communicate a control signal to the at least one water valve that opens the at least one water valve at the low weight and closes the at least one water valve at the high weight.

In at least one embodiment, the at least one weight sensor comprises a weight scale located beneath the plant.

In at least one embodiment, the at least one weight sensor is in communication with the at least one controller with a wireless connection.

In at least one embodiment, the controller further operable to store a schedule and determine the weight of the plant according to the stored schedule.

In at least one embodiment, the plant watering system includes a plurality of weight sensor, each associated with a different plant, the controller further operable to water each of the plants individually up to a high weight associated with each of the plants.

In at least one embodiment, the controller includes at least one input device for a user to set at least one of the low and the high weight from an in situ reading of the weight of the plant.

In at least one embodiment, the controller is further operable to check the weight of the plant and water the plant automatically based on the low and high weights.

In at least one embodiment, the controller is further operable to adjust the low and high weights to account for predictable plant growth.

In at least one embodiment, the controller is further operable to determine that the weight of the plant hasn't increased according to a predictable plant growth and signal an alarm based thereon.

In at least one embodiment, the controller is further operable to determine that the weight of the plant hasn't increased according to a predictable amount during or after a watering cycle and signal an alarm based thereon.

BRIEF DESCRIPTION OF THE FIGURES

FIG. 1 is a block diagram of an automated watering system according to at least one embodiment of the systems disclosed herein.

DETAILED DESCRIPTION OF THE INVENTION

The present application generally provides an automated plant watering system (APWS) that automatically waters a plant based on its weight. This system is intended for situations where a plant's weight is only altered by additional plant growth and addition/evaporation of water in its container.

Referring to FIG. 1, in a least one embodiment, the APWS is coupled to a water source, which may be a low pressure water line from a container or from a municipal water supply. The water source may also be a container that can be refilled from rain water, manually, automatically or with any other adequate method. The APWS generally includes an electronic control module that contains a controller, a user interface or display, a memory, and any other circuitry to provide the functionality disclosed herein, such as a timer circuit to maintain the current date and time, watering or testing schedules, etc., an input device for users to enter data, and various inputs and outputs for receiving signals from weight or other sensors and to activate water valves, pumps, etc. as well as to provide the additional functionality discussed herein.

The APWS may also include one or more electronic weight sensors that produce a signal that corresponds to the weight of a plant. Depending on the particular application of the system, the sensor can be a piezo-electric sensor by itself, incorporated into a platform/mat or any other third party sensor that meets APWS system requirements. The sensor may be integrated into a mat with a power source, such as a solar cell, and may also include a wireless transmitter that communicates the weight signal to the control module. Each of the sensors or mats may be uniquely identifiable by the control module in order for the module to service a plurality of plants each on individual sensors or mats. Data may be collected from 1 or more sensors or types of sensors (weight, humidity, barometric pressure, weather forecast, etc.).

The components of the system may be coupled with wires to provide power to the components, such as the sensors, valves, relays, etc., and for communicating control signal thereto and therefrom for controlling the functions of the components. For example, wires may connect the sensor or mat to the controller and wires may connect the valve to the controller. These wires may be used to communicate the weight data to the controller and to control the water valve, pump or any other integrated components or functional modules. Alternatively or additionally, some or all of this functionality may be wireless.

The water source may be connected with hoses to water valves and the valves may be connected with hoses to appropriate end delivery adaptors for drip, soaker hose, etc. to deliver water. Relays that can activate many types of electrical devices may also be used. For example, solenoid valves for turning water flow on/off for each of the plants in the system may be used. These valves may provide water to an entire area of plants, or to many areas or individual plants individually. Additionally, water pumps, triggers for automated sub-module, etc. may also be used in the system.

The system includes or is coupled to a power source. This could be standard grid power, batteries, solar or other module.

The system may include a removable memory card for temporarily storing data collected during operation, including but not limited to watering times, weight data, environmental temperature/pressure/humidity/lighting data, error messages, etc.

Optionally, the system may include a communication module or modules that would allow wireless communication and/or control of the APWS unit and a 'base station' control PC and/or users home PC.

The APWS is generally operated by first setting set up APWS to read the weight of a plant. For example, after the APWS is turned on, a plant may be placed on top of the weight sensor or mat as shown in FIG. 1. A user thereafter presses the 'Low Water' button or otherwise registers a low weight with the control module. This low weight value can be adjusted by the user via provided interface buttons and re-saved. After watering the plant and removing any excess water, the user may then press the 'Full Water' button which registers a high weight with the control module. This high weight value can be adjusted by the user via provided interface buttons and re-saved. The low and high weights may be stored in the memory of the control module as a reference for watering the plant as discussed herein. Weight set points and other data may stored locally and/or may also be communicated to a 'base station' controller PC or other specially developed or modified device.

The user may then program the time/days for the APWS to check on the plant for water and thereafter sets the system into 'auto' mode. At the defined time, the APWS will check the weight of the plant. If the plant needs water, a relay may be activated by the controller to start a pump, then the water control valve for that plant and associated area(s) is opened and water is allowed to flow for a certain amount of time, such as 10 seconds, and/or until the high weight is achieved. After a brief delay, the APWS checks the weight of the plant again. If more water is needed, then the process of adding water is repeated until the desired weight is achieved. The system may also operate based on the low level reading. For example, the control module may monitor the weight of the plant to determine if a low weight is achieved. When this occurs, the system may water the plant as discussed above until the high weight is achieved.

The APWS system may be able to utilize many types of inputs to determine the best choice of operating mode. For example, based on sensor input from various types of sensors (weight, humidity, barometric pressure, weather forecast, etc.) the system may water less or not at all in anticipation of rainy weather. Or, decide to delay starting watering operations if another system is already using the watering supply. Additionally, previous operational data (for example, error codes, weight changes due to plant growth, etc.) may be used to change operating behavior. For example, calculate new low/high set points to compensate for plant growth, etc.

During a watering cycle, if the weight of the plant hasn't increased as expected based on default or user defined parameters (for example, weight change due to added water or predicable plant growth, scheduled fertilizer amendments, etc.) the APWS may start troubleshooting procedures that, with the right module/options can culminate with a phone call or text message to the owner to notify them that the system needs attention.

The APWS has options that will allow it to be connected & controlled by a PC. The PC interface, either wired or wireless, allows the user to view collected data & access to more control variables to fine tune their plant care requirements. The PC or other suitable device may control or monitor one or more APWS control units.

Intended for home & industrial use, the APWS control module can accommodate inputs from more than one weight sensor module. This feature and the systems non-proprietary modularity allow users to scale and configure the APWS in many ways to meet their unique situations. For example, because the APWS uses electronic sensors to measure when something needs water, the system could just as easily be used for plants with low soil content like cactus and bonsai plants or adding water to a fountain.

While the foregoing has been described in some detail for purposes of clarity and understanding, it will be appreciated by one skilled in the art, from a reading of the disclosure, that various changes in form and detail can be made without departing from the true scope of thereof.

What is claimed is:

1. A method of plant watering comprising:
   receiving, by a control module, a signal from at least one weight sensor corresponding to a weight of a plant measured by the at least one weight sensor;
   storing, by the control module, a low weight and a high weight of the plant measured with each of the at least one weight sensor;
   automatically adjusting, by the control module, the stored low and high weights according to a predicted growth of the plant; and
   communicating, by the control module, a control signal to at least one water valve that opens at the low weight and closes at the high weight.

2. The method of claim 1, wherein the at least one weight sensor comprises a weight scale located beneath the plant.

3. The method of claim 2, wherein the at least one weight sensor is in communication with the control module with a wireless connection.

4. The method of claim 1, wherein the control module further stores a schedule and determines the weight of the plant according to the stored schedule.

5. The method of claim 1, wherein the control module is in communication with a plurality of weight sensors, each associated with a different plant, the method comprising watering, by the control module, each of the plants individually up to a high weight associated with each of the plants.

6. The method of claim 1, wherein control module comprises at least one input device for a user to set at least one of the low and the high weight from an in situ reading of the weight of the plant.

7. The method of claim 1 comprising, checking by the control module, the weight of the plant and watering the plant automatically based on the low and high weights.

8. The method of claim 1 comprising, determining by the control module, that the weight of the plant hasn't increased according to a predictable added water or plant growth and signaling an alarm based thereon.

* * * * *